Figure 1:
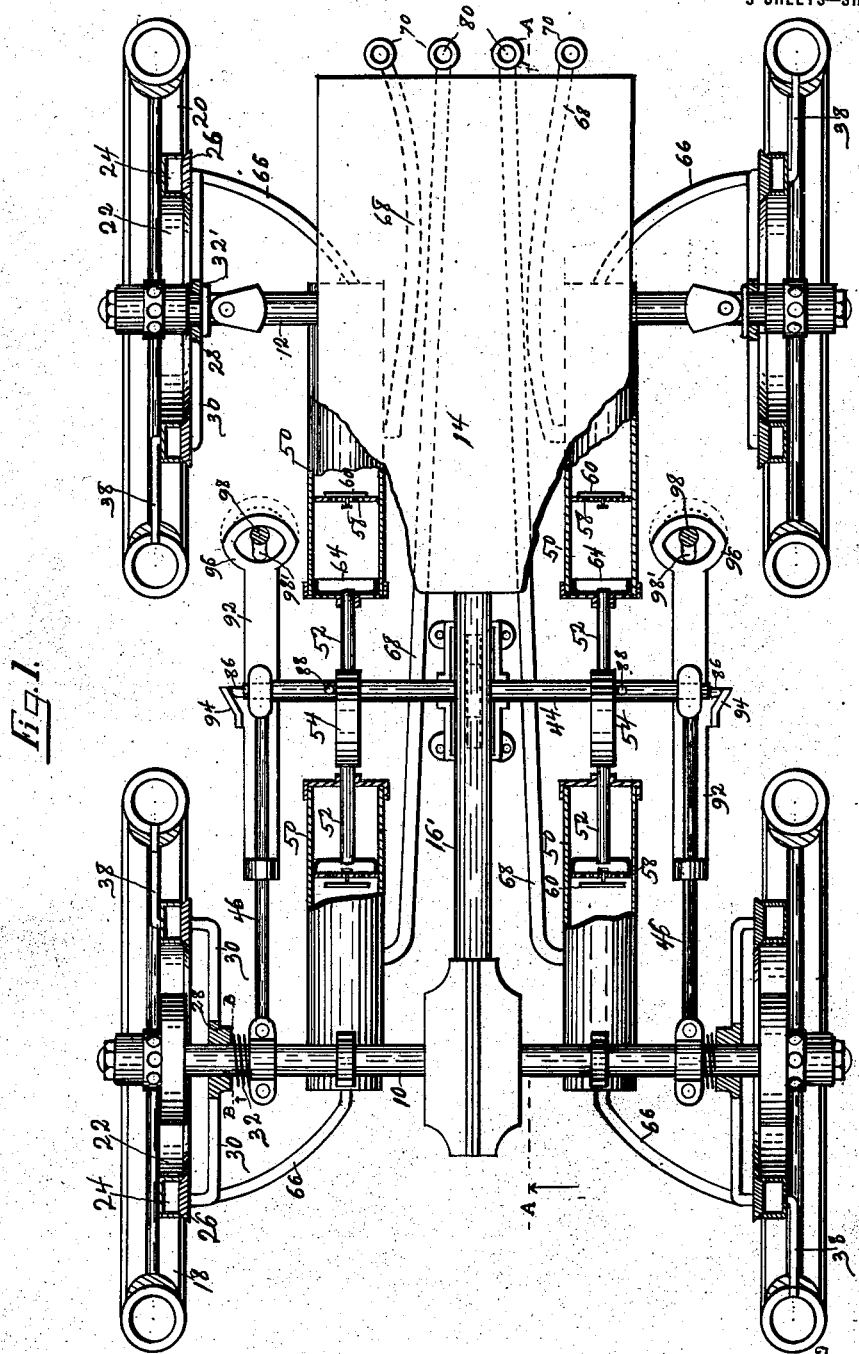

W. S. ESTLE.
AUTOMATIC PNEUMATIC TIRE INFLATING MEANS.
APPLICATION FILED NOV. 7, 1914.

1,183,859.  
Patented May 23, 1916.  
3 SHEETS—SHEET 1.

Witnesses  
Inventor  
William S. Estle  
By Chas. S. Lakefield,  
his Attorney

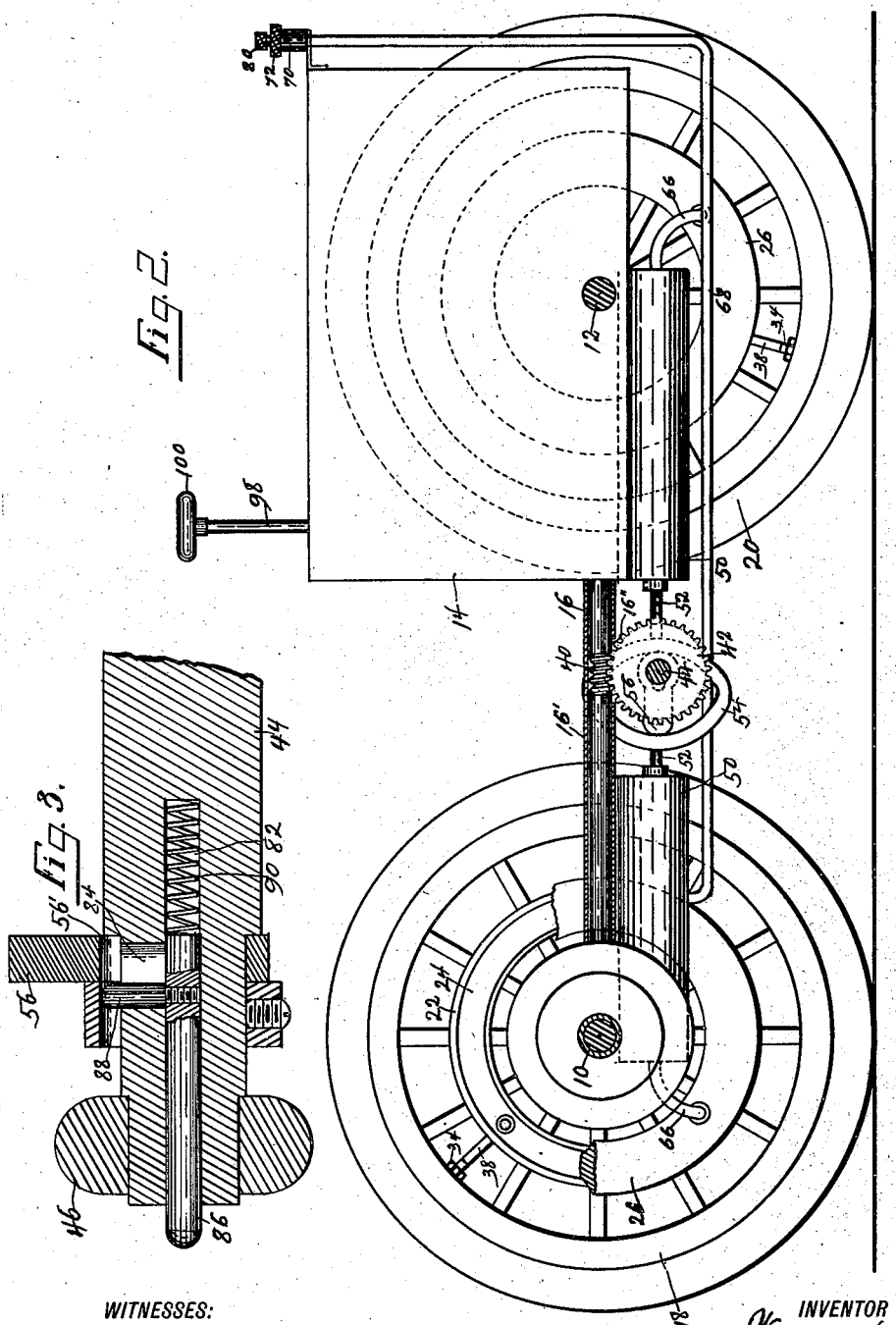
W. S. ESTLE.
AUTOMATIC PNEUMATIC TIRE INFLATING MEANS.
APPLICATION FILED NOV. 7, 1914.
1,183,859.
Patented May 23, 1916.
3 SHEETS—SHEET 2.
WITNESSES:
INVENTOR
William S. Estle,
BY
Chas. S. Lahofski,
his ATTORNEY

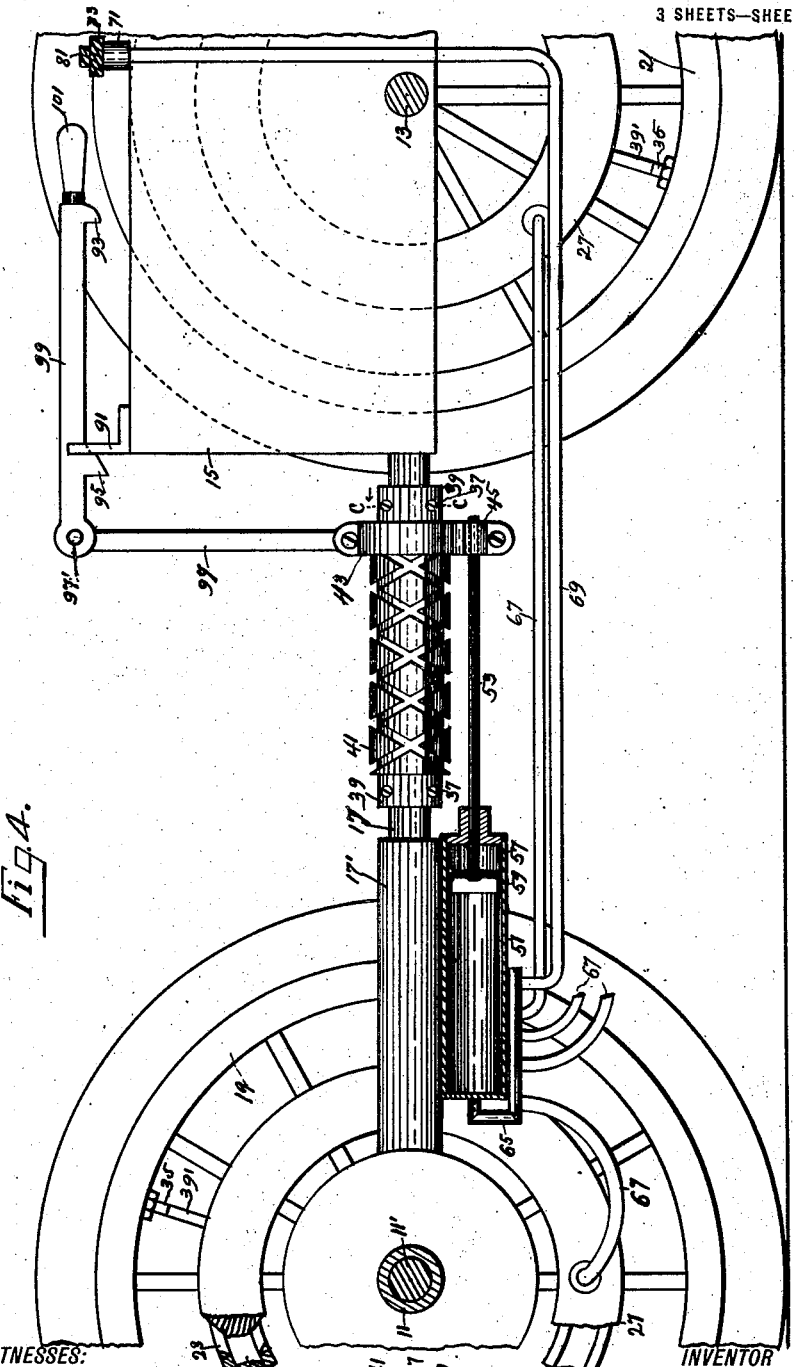

UNITED STATES PATENT OFFICE.

WILLIAM S. ESTLE, OF NEW YORK, N. Y.

AUTOMATIC PNEUMATIC TIRE-INFLATING MEANS.

1,183,859.   Specification of Letters Patent.   Patented May 23, 1916.

Application filed November 7, 1914. Serial No. 870,739.

*To all whom it may concern:*

Be it known that I, WILLIAM S. ESTLE, a citizen of the United States, residing at New York, in the borough of Manhattan and State of New York, have invented new and useful Automatic Pneumatic Tire-Inflating Means, of which the following is a specification.

The invention herein enunciated relates to pneumatic-tire-shod vehicles, and the prime object thereof is to provide means for keeping up the inflation of a leaky tire during its travel.

The other important objects of this invention will become obvious from the descriptions of the advantages conserved by the use of the elements and combinations of elements of the means and mechanisms hereinafter described.

In the drawings Figure 1 is a top plan view of the truck of a power driven, pneumatic-tire-shod vehicle equipped with the automatic tire-inflating means of my invention; the wheels and the annular casing attached to each of them are shown in section, and only so much of the truck is shown as is necessary to illustrate the principles of my invention. Fig. 2 is a section on the line A—A of Fig. 1. Fig. 3 is an enlarged section of one of the ends of the pump-piston-operating shaft shown in Fig. 1. Fig. 4 is a modification, and what is at the present deemed the preferred form of construction, of the means for operating the pump piston or pistons by the rotation of a member of the vehicle or its driving means. Fig. 5 is a section on the line C—C of Fig. 4.

Similar characters of reference denote corresponding parts throughout the several views.

Generically the automatic tire-inflating means of the present invention consists of: first, means for conveying air into the tire or tires of a vehicle in motion, and, second, means for operating a pump or pumps by the rotation of some suitable member of the vehicle or its driving mechanism while in motion. Practically all the pneumatic-tire-shod vehicles are now driven by some source of power, and most of the power driven vehicles now in use transmit the power from the motor or engine to the rear axle by means of a drive shaft disposed at right angles to the latter. I have therefore illustrated the principles of my invention on a truck in which the power of the motor is transmitted to the rear axle by means of a drive shaft disposed at right angles thereto. Since, as will appear hereinafter, all it is required is some sort of a rotatable member, those who are proficient in the art to which this invention appertains will readily adapt the principles of this invention to every other form of pneumatic-tire-shod vehicle.

Referring particularly to Fig. 1, 10 is the rear axle of the vehicle; 12 its front axle; 14, its power yielding mechanism—engine or motor; 16, the drive shaft which transmits the power from the latter to the said rear axle; 18, the pneumatic-tire-shod rear wheels; 20, the pneumatic-tire-shod front wheels of the vehicle. These parts constitute the truck of the vehicle which, being no part of my invention, may be of appropriate construction deemed feasible.

To the inner side of each of the wheels 18 and 20 is held concentrically a ring 22 having a channel 24 therein. The said ring is held to the wheel so as to rotate therewith. Each of the said rings is provided with a closely fitting cover 26, held thereto movable circularly, and thus the channel 24 in the ring 22 forms a composite air-tight circular chamber one part of which is stationary and the other movable circularly. To insure airtightness and provide for wear, the contacting surfaces of the said ring and cover are suitably beveled off, as shown in Figs. 1 and 2.

In most of the power driven vehicles now in use the rear wheels are furnished with either brake drums or sprocket wheels and the front wheels with gears for operating certain apparatus. To avoid interfering with the operation of these devices or with the bands, chains, or rods which connect the same to certain other devices, each of the covers 26 is provided with a hub 28 concentrically held thereto by means of two or more spokes 30, as clearly shown in Fig. 1. The hubs 28, which to facilitate the mounting on the axles are preferably made in halves and bolted together as shown, are mounted on the axles 10 and 12 non-rotatably, but so as to have a slight axial movement against the tension of springs 32, so that under the influence of the latter and the conicity of the covers 26 the ring 22 is self-adjusting. Where the room is limited, the said springs may be substituted by compressible rubber washers 32′, as shown in Fig. 1. The air chamber in the ring 22 communicates with the usual tire valve 34 through the medium of a suitable tubular connection 38, and each of the covers 26 is provided with a nipple 36 for connecting the same with a source of air supply, as shown in Fig. 3; and thus the air pumped into the chamber 24 through the stationary nipple 36 enters the tire whether the wheel is at rest or in motion.

In some of the power-driven vehicles the drive shaft 16 revolves in a closely fitting casing 16' which extends from the incased rear axle 10 direct to the casing 14 containing the engine or motor, as in Fig. 1, while in others part of the drive shaft 16 is exposed, as in Fig. 6. In the case of the former construction a worm or screwthread 40 may be cut or otherwise formed in the circumference of the shaft 16 and an opening 16" made, preferably, in the underside of the casing 16' for the accommodation of a part of the gear 42 held in mesh with the worm 40, as shown in Fig. 2. The said gear wheel is held rigidly on a shaft 44 journaled in oppositely disposed arms 46 preferably clamped to the incased rear axle 10, as shown in Fig. 1; and thus the rotation of the shaft 16 imparts slow rotary motion to the shaft 44.

In order to provide a pump for each tire, oppositely disposed pairs of pumps 50 the piston rods 52 of each pair of which are preferably connected to each other, and to avoid a swinging motion of the piston rods preferably by an elliptically shaped yoke 54 are suitably held in position so that the said shaft 44 rotate within the said yokes, as shown in Fig. 1. On the shaft 44 are suitably mounted eccentrics 56 which when the said shaft is in motion move the piston rods 52 reciprocatingly compressing the air in the pumps alternately.

To store up air under compression for use when the vehicle is not in motion, preferably the barrels of the pumps 50 are made longer than needed and a false bottom 58 and valve 60 are interposed between the real bottom 62 and the plunger cup 64 in each pump, as shown in Fig. 1.

Each of the pumps 50 is connected to a nipple in the cover 26 of the wheel adjacent thereto by a tube 66 and provided with a pop valve 70, situated within reach of the rider, connected thereto by a tube 68, as clearly shown in Figs. 1 and 2. And thus the leaky tire is automatically inflated during the travel of the vehicle and when full the surplus air escapes through the valve 70.

Means is provided for disconnecting the pump-operating mechanism when its service is not needed. This means may be of any appropriate construction deemed feasible, but is preferably of the following construction: In each end of the shaft 44 is an axial bore 82 and a short elongated slot 84 in which a rod 86 provided with a stud 88 is held slidably against the tension of a spring 90, and in each of the eccentrics 56 is a key way 56' into which, when the rod 86 is pushed inwardly, the stud 88 enters and keys the eccentric to the shaft, as clearly shown in Fig. 3. A bar 92 —Fig. 1,— suitably mounted slidable longitudinally, is provided with a cam piece 94 which, when the bar is moved longitudinally, pushes the rod 86 inwardly and thus keys the eccentric 56 to the shaft 44.

Means is provided for manipulating the bar 92 at a point within convenient reach of the rider, which means is preferably of the following construction: The free end of each of the bars 92 is provided with a yoke 96, and a rod 98, suitably mounted rotatably at right angles thereto, is provided with an eccentric 98' at one end and a knob 100 at its opposite end, as clearly shown in Figs. 1 and 2. A turn of the knob 100 one half of a revolution causes the eccentric 98' to move the bar 92 the requisite distance to connect, or disconnect, the eccentric 56 to the shaft 44. In fitting this mechanism the bar 92 is suitably curved and bent so as to bring the knob 100 within convenient reach of the rider. And thus by means of the mechanisms and arrangements of the parts described any one or two or all the four tires of the vehicle may be inflated, or when leaky the inflation kept up, automatically during the travel of the vehicle and without dismounting to throw the pumps in or out of operation. It is obvious that only one or one pair of pumps may be operated by the means and mechanisms described and tubes therefrom led to the rings 22 on the four wheels. Hence, I reserve the right to use one, two or more pumps in connection with the air-chamber containing annular members on the wheels and the specific construction of the mechanisms described.

In power driven vehicles in which the drive shaft is partly exposed, as in Fig. 4, and in every other construction of driven or drawn vehicle in which it is possible to utilize such means, I prefer to use either of the forms of right-and-left-hand, or return-thread, screw piston-moving means shown in Fig. 4.

Referring to Figs. 4 and 5, on the part of the drive shaft 17 extending from the casing 17' is, to avoid weakening the shaft and facilitate the mounting without dismembering the truck, mounted a right-and-left-hand, or return-thread, screw 41 provided with a nut 43—both of which are made in sections—in which the free end of the piston rod 53 is held. Tubes 67 connect the pump barrel 51 to the covers 27 and a tube 69 to the valve 71, as shown. From the nut 43 extends a bar 97 to the free end of which is hinged a bar 99 provided with projections 95, 93 on its under edge and preferably with a handle 101. The bar 99 is held slidably in a slot made in a fixed plate 91. And thus when the bar 99 is in the position shown, the rotation of the shaft 17 moves the nut, and the piston rod 53 held thereto, reciprocally the length of the screw 41. When the valve 71 blows off, the rider lifts the handle 101 and pulls the bar 99 rightward until the projection 95 contacts with the opposite face of the plate 91. The nut 43 is thus made to run off the threaded part of the screw 41 and the operation of the pump ceases.

I claim—

1. In a power driven vehicle, the combination of a shaft connecting its driving mechanism to its wheels provided with suitable screw-threads, a pump piston mounted movably reciprocatingly alongside of the said shaft, and means adapted to be moved by the said threads operatively connecting the said piston to the said shaft so that the rotation of the latter will move the former reciprocatingly.

2. The combination, in a power driven vehicle, of a shaft connecting its driving mechanism to its wheels provided with suitable screw-threads, a pump piston mounted movably reciprocatingly parallelly with the said shaft, means adapted to be moved by the said threads operatively connecting the said piston to the said shaft, and a lever for disconnecting the said piston from the said shaft.

3. In a power-driven vehicle the combination of a screw-threaded shaft rotatable by the propelling mechanism of the latter, a nut on the threaded part of the shaft, a pump piston connected to the said nut, and means for moving the said nut out of engagement with the said threads on the shaft.

4. In a power-driven vehicle the combination of a shaft rotatable by the propelling mechanism of the latter, a sleeve with return threads therein mounted on the said shaft, a nut on the sleeve, a pump piston connected to the said nut so that the traversing of the latter move the former reciprocatingly, and means for moving and holding the said nut out of engagement with the threads in the sleeve.

In testimony whereof I affixed my signature in the presence of two witnesses this 4th day of November, 1914.

WILLIAM S. ESTLE.

Witnesses:
JOHN M. BEATON, Jr.,
HARRY PATTERSON.